May 27, 1924.

N. KOPP

LENS OR COVER GLASS

Filed June 11, 1919

1,495,521

WITNESSES

INVENTOR

Patented May 27, 1924.

1,495,521

UNITED STATES PATENT OFFICE.

NICHOLAS KOPP, OF PITTSBURGH, PENNSYLVANIA, ASSIGNOR TO PITTSBURGH LAMP, BRASS & GLASS COMPANY, OF PITTSBURGH, PENNSYLVANIA, A CORPORATION OF NEW JERSEY.

LENS OR COVER GLASS.

Application filed June 11, 1919. Serial No. 303,385.

*To all whom it may concern:*

Be it known that I, NICHOLAS KOPP, a citizen of the United States, residing at Pittsburgh, in the county of Allegheny and State of Pennsylvania, have invented certain new and useful Improvements in Lenses or Cover Glasses, of which the following is a specification.

This invention relates to improvements in lenses or cover glasses for lamps for automobiles, railway cars, etc., and more particularly to a lens or cover glass designed for use on tail lights or lamps used at the rear of automobiles, cars, etc.

In lamps or lights of the class to which the present invention relates, it has heretofore been the general practice to employ a condensing lens or cover glass of the Fresnel type. In such lamps, a source of light is disposed at the focal point of the lens or cover glass, and the rays of light passing through the lens are projected in a concentrated beam of light along the horizontal axis of the lens. This concentration or intensifying of the beams of light allows the lamp to be visible for a considerable distance in line with the horizontal axis of the beam, but limits the width of the zone in which the light is visible.

The use of a lens or cover glass that simply diffuses the light would be unsatisfactory for this purpose, owing to the fact that the intensity would be so diminished as to be of little value.

The prime object of my invention is to provide a lens or cover glass having means for spreading the light over a zone of considerable width without sacrificing the efficiency of the concentrated beam projected along the horizontal axis of the lens.

I accomplish this by providing a lens or cover glass which will project only a part of the total light in a concentrated beam in line with the axis and the remainder of the light in such a manner as to spread the light over a zone of the desired width and location. It will be understood that the width and location of the zone may be varied to conform with different conditions.

Figure 1:
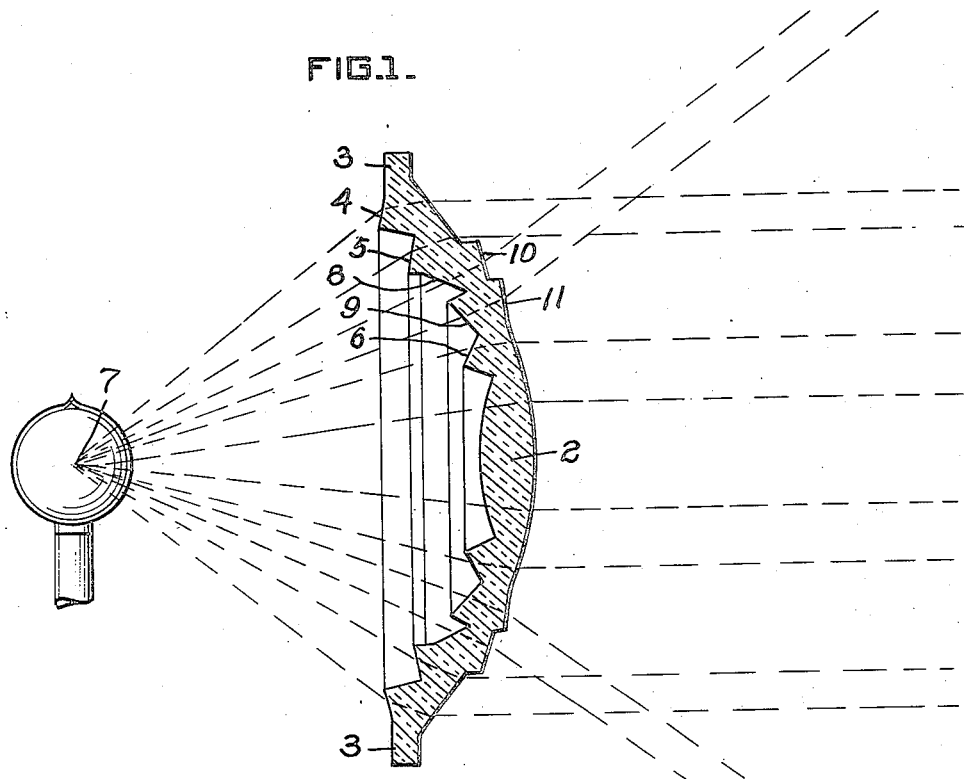
Figure 2:
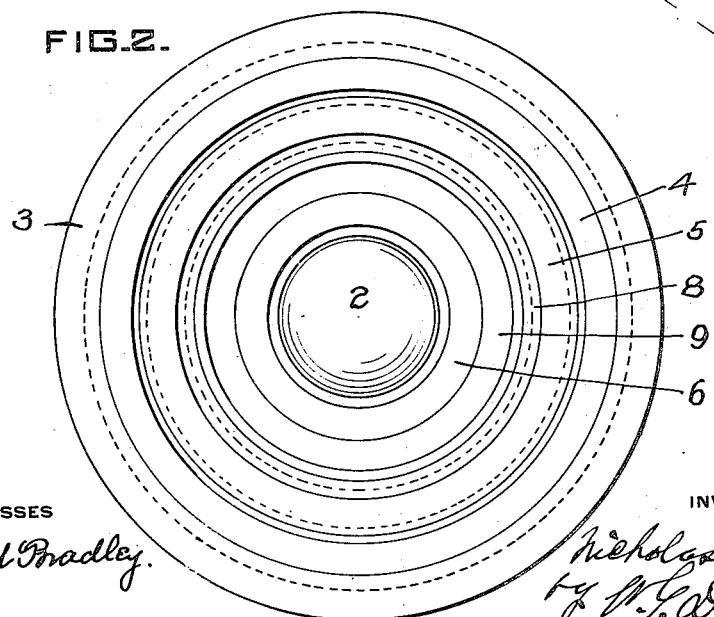

In the accompanying drawing which illustrates an application of my invention,

Fig. 1 is a central sectional view of a lens or cover glass embodying my invention; and Fig. 2, a rear elevational view.

Referring to the drawing, the lens or cover glass, as illustrated and as preferred, includes a central convex or lenticularly curved circular portion 2. Portion 2, however, may be concave although I prefer to have this portion convex, as shown.

On the rear face of the lens, and arranged in the form of concentric circles, I provide a plurality of prismatic elements or steps, said steps being bounded by an annular edge portion 3.

As shown, the steps or prisms on the rear face include two outer steps 4 and 5 of slightly variant angles and an inner step 6, the latter being disposed adjacent the central portion 2 and having substantially the same angularity as step 5. It will be understood that the central portion and steps above described are similar to a Fresnel lens and function to project the light rays passing through the lens from the focal point 7, in a concentrated beam of light along the horizontal axis of the lens.

Interposed between the steps 5 and 6, I provide steps 8 and 9, said latter steps being reversely disposed relatively to steps 5 and 6, i. e., the thick portion of the steps or bases of the prisms being towards the edge portion 3 of the lens, or reversed. The function of these steps 8 and 9 is to direct the light rays passing therethrough outwardly from the horizontal axis of the lens, thereby producing a cone-shaped beam.

While I have shown two steps for throwing the light rays outwardly to provide the beam mentioned, and said steps interposed between the steps 5 and 6, I do not limit myself to the number of reversely disposed steps which may be employed.

In addition to one or more steps 8 and 9 on the rear face, I preferably form steps 10 and 11 on the front face of the lens, these latter steps like steps 8 and 9 having the thick portion of the step or the base of the prisms directed towards the edge of the lens. The faces of the steps 8, 9, 10 and 11 may be straight, convex or concave.

What I claim is:—

A lense or cover glass comprising an integral body having a lenticularly curved central portion, an inner annular step or prism on its rear face, adjacent the central portion, an outer annular step or prism on its rear face, an intermediate annular step or prism on its rear face, said latter prism having its base reversely disposed relatively to the bases of said inner and outer prisms, and an annular prism on the front face and disposed over said intermediate prism on the rear face in such manner that light passing through the intermediate prism will pass through the prism on the front face.

In testimony whereof I affix my signature in presence of two witnesses.

NICHOLAS KOPP.

Witnesses:
J. M. GEOGHEGAN,
LOIS WINEMAN.